US008166249B2

(12) United States Patent
Koehler et al.

(10) Patent No.: US 8,166,249 B2
(45) Date of Patent: Apr. 24, 2012

(54) PERFORMING A LEAST RECENTLY USED (LRU) ALGORITHM FOR A CO-PROCESSOR

(75) Inventors: Thomas Koehler, Holzgerlingen (DE); Siegmund Schlechter, Lorch (DE)

(73) Assignee: International Business Machines Corporation, Armonk, NY (US)

(*) Notice: Subject to any disclaimer, the term of this patent is extended or adjusted under 35 U.S.C. 154(b) by 631 days.

(21) Appl. No.: 12/399,416

(22) Filed: Mar. 6, 2009

(65) Prior Publication Data
US 2009/0228667 A1   Sep. 10, 2009

(30) Foreign Application Priority Data

Mar. 10, 2008   (DE) .................................. 08152507

(51) Int. Cl.
   *G06F 12/00*   (2006.01)
(52) U.S. Cl. ............... 711/136; 711/203; 711/E12.059; 708/203; 709/247; 710/68
(58) Field of Classification Search ............... None
   See application file for complete search history.

(56) References Cited

U.S. PATENT DOCUMENTS 5,951,623 A * 9/1999 Reynar et al. ................. 708/203

OTHER PUBLICATIONS

"Principles of Operation", International Business Machines, Second Edition, Oct. 2001, 1024 pages.
"Principles of Operation", International Business Machines, First Edition, Dec. 2000, 1026 pages.
Koehler, Thomas et al., "Memory attached accelerator and Translation Lookaside Buffer for a Co-Processor", Serial No. 08/21864.6 filed Jan. 1, 2008, 31 pages.
Rayns, Chris et al., "IBM eserver zSeries 990 (z990) Cryptography Implementation", International Business Machines Corp., First Edition, Aug. 2004, 238 pages.
Slegel, T.J. et al., "The IBM eServer z990 microprocessor", IBM Journal of Research and Development, vol. 48, No. 3/4, May/Jul. 2004, pp. 295-309.

* cited by examiner

*Primary Examiner* — Reginald Bragdon
*Assistant Examiner* — Thanh D Vo
(74) *Attorney, Agent, or Firm* — Francis Lammes; Stephen J. Walder, Jr.; Diana R. Gerhardt (57) ABSTRACT

A method to perform a least recently used (LRU) algorithm for a co-processor is described, which co-processor in order to directly use instructions of a core processor and to directly access a main storage by virtual addresses of said core processor comprises a TLB for virtual to absolute address translations plus a dedicated memory storage also including said TLB, wherein said TLB consists of at least two zones which can be assigned in a flexible manner more than one at a time. Said method to perform a LRU algorithm is characterized in that one or more zones are replaced dependent on an actual compression service call (CMPSC) instruction.

20 Claims, 8 Drawing Sheets

Fig. 1A

| LRU entries actual state reassign oldest   keep youngest | LRU after new assignment of 32 KB dictionary size CMPSC instruction oldest   youngest | LRU after new assignment of 64 KB dictionary size CMPSC instruction oldest   youngest |
|---|---|---|
| 0 1 2 3 | 1 2 3 0 | 2 3 0 1 |
| 0 1 3 2 | 1 3 2 0 | 3 2 0 1 |
| 0 2 3 1 | 2 3 1 0 | 0 1 2 3 |
| 0 2 1 3 | 2 1 3 0 | 2 3 0 1 |
| 0 3 1 2 | 3 1 2 0 | 3 2 0 1 |
| 0 3 2 1 | 3 2 1 0 | 0 1 2 3 |
| 1 0 2 3 | 0 2 3 1 | 2 3 0 1 |
| 1 0 3 2 | 0 3 2 1 | 3 2 0 1 |
| 1 2 3 0 | 2 3 0 1 | 1 0 2 3 |
| 1 2 0 3 | 2 0 3 1 | 2 3 0 1 |
| 1 3 2 0 | 3 2 0 1 | 1 0 2 3 |
| 1 3 0 2 | 3 0 2 1 | 3 2 0 1 |
| 2 0 1 3 | 0 1 3 2 | 2 3 0 1 |
| 2 0 3 1 | 0 3 1 2 | 0 1 2 3 |
| 2 1 0 3 | 1 0 3 2 | 2 3 0 1 |
| 2 1 3 0 | 1 3 0 2 | 1 0 2 3 |
| 2 3 0 1 | 3 0 1 2 | 0 1 2 3 |
| 2 3 1 0 | 3 1 0 2 | 1 0 2 3 |
| 3 0 1 2 | 0 1 2 3 | 3 2 0 1 |
| 3 0 2 1 | 0 2 1 3 | 0 1 2 3 |
| 3 1 0 2 | 1 0 2 3 | 3 2 0 1 |
| 3 1 2 0 | 1 2 0 3 | 1 0 2 3 |
| 3 2 1 0 | 2 1 0 3 | 1 0 2 3 |
| 3 2 0 1 | 2 0 1 3 | 0 1 2 3 |

Fig. 1B

| CMPSC Instruction Dictionary size | represented in TLB by | TLB requirement | must use zones | LRU oldest zone | LRU youngest zone |
|---|---|---|---|---|---|
| 128 KByte | 32 * 4 KB pages | 4 zones | 0 and 1 and 2 and 3 | 0 | 3 |
| 64 KByte | 16 * 4 KB pages | 2 zones | 0 and 1 or 2 and 3 | 0 or 2 | 1 or 3 |
| 32 KByte | 8 * 4 KB pages | 1 zone | 0 or 1 or 2 or 3 | 0 or 1 or 2 or 3 | 0 or 1 or 2 or 3 |

Fig. 1C

| LRU bit | Zone | is older than Zone |
|---|---|---|
| 0 | 0 | 1 |
| 1 | 0 | 2 |
| 2 | 0 | 3 |
| 3 | 1 | 2 |
| 4 | 1 | 3 |
| 5 | 2 | 3 |

PERFORMING A LEAST RECENTLY USED (LRU) ALGORITHM FOR A CO-PROCESSOR

BACKGROUND

The present invention relates to microprocessor design and more particularly to microprocessors with memory attached accelerators.

A so-called memory attached accelerator typically comprises a co-processor that is added to a processor core of a microprocessor in order to perform special tasks.

Prior art machines have a micro-architecture with the co-processor integrated into the processor core and running at core frequency, which is significantly lower than in up-to-date machines actually developed. Therefore within prior art machines it is possible to share the processor cores Instruction-cache (I-cache) and Instruction-Translation Lookaside Buffer (I-TLB) with the co-processor for dictionary fetches with only small impact on throughput and latency.

An actual processor core having a co-processor integrated in the core processor is e.g. the IBM eServer z990 microprocessor, known e.g. from Slegel et Al: 'The IBM eServer z990 microprocessor'; IBM J. Res. & Dev. Vol. 48; No. 3/4; May/Jul. 2004; pp 295-309, or from Rayns et Al.: 'IBM eServer zSeries (z990) Cryptography Implementation'; IBM Redbooks; 2004; ISBN 0738490369.

Since recent processor cores in actual machines run at significantly higher frequency than previous machines, in the actual development co-processors will no longer be integrated into the processor core but are treated as separate units within the micro-architecture running slower, e.g. at half the frequency of the processor cores. Thus microprocessors actually developed have a co-processor for data compression and cryptography assigned, which is physically located on the processor chip, but outside the individual processor cores. Such a co-processor needs to fetch dictionary entries by means of virtual storage references.

Thus a memory attached accelerator is under development having a micro architecture with at least one co-processor separated from at least one core processor. The co-processor directly uses the instructions of the core processor and directly accesses a main storage by virtual addresses of the core processor. Said co-processor comprises a Translation Lookaside Buffer (TLB), in order to use virtual addresses of the core processor to directly access said main storage.

In previous machines, where the co-processor was still integrated into the processor core, the dictionary accesses could be performed via the I-cache and I-TLB. In contrast in an up-to-date processor core like e.g. in the IBM eServer z990 microprocessor this can cause excessive access latencies. Thus the co-processor of such an up-to-date processor core has a dedicated memory storage like e.g. a dedicated cache infrastructure. This includes also the dedicated TLB mentioned above for the virtual to absolute address translations, since the co-processor accesses are virtually.

Thereby the following problem arises. Since such TLB are made of preferably four compartments or zones that can be assigned in a flexible manner, more than one at a time, e.g. two compartments or zones can or are to be replaced at a same time. This implies to adapt accordingly the least recently used (LRU) algorithm, according to which always the, i.e. a single, eldest cache entry is replaced by the, i.e. a single, youngest entry.

In other words, common LRU algorithms are based on the rule to replace the oldest usually least recently or least frequently used entry first. They replace exactly this entry exclusive during regular updates.

When replacing more than one entry at a time, to apply the common LRU algorithm will not be so effective.

BRIEF SUMMARY

In one illustrative embodiment, a method, in a data processing system, is provided for processing a set of instructions. The illustrative embodiment receives, in the co-processor, the set of instructions to access a main memory from a processor, wherein the set of instructions comprise a set of a virtual addresses. The illustrative embodiment translates the set of virtual addresses to a set of absolute addresses in order to access the main memory. In translating the set of virtual addresses to the set of absolute addresses, the illustrative embodiments access a Translation Lookaside Buffer (TLB) that comprises a plurality of zones that are assigned in a flexible manner more than one at a time. In the illustrative embodiment, one or more zones of the plurality of zones are replaced dependent on an actual compression service call (CMPSC) instruction.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

DETAILED DESCRIPTION

The shortcomings of the prior art are overcome and additional advantages are provided by performing a LRU algorithm for a co-processor of a memory attached accelerator having a micro architecture with at least one co-processor separated from at least one core processor. The co-processor directly uses the instructions of the core processor and directly accesses a main storage by virtual addresses of the core processor. The co-processor comprises a TLB with entries or pages stored in compartments or zones, in order to use virtual addresses of the core processor to directly access the main storage. The co-processor further comprises a dedicated memory storage, like e.g. a dedicated cache infrastructure, also including the dedicated TLB mentioned above for the virtual to absolute address translations by using the entries or pages within the compartments or zones, since the co-processor accesses are virtually. According to the illustrative embodiments, the LRU algorithm schedules replacing one or more entries, which here are compartments or zones, dependent on an actual compression service call (CMPSC) instruction.

It is important to mention that the method to perform a LRU algorithm according to the invention is not limited on co-processors of memory attached accelerators. The method to perform a LRU algorithm is rather applicable for all kind of TLBs which manage more than one zones or compartments.

The method to perform a LRU algorithm according to the invention has the advantage over the state of the art, that it allows an effective implementation through vectors for youngest and oldest entries.

According to the invention, a substantial improvement is obtained when using a LRU algorithm different from the state of the art but also based on the main rule to keep the newest entry. Thus, in contrast to the state of the art LRU algorithms, the LRU algorithm performed by the method according to the invention replaces one or more entries dependent on the actual CMPSC instruction.

The CMPSC instruction may need dictionary sizes of 32 KB, 64 KB or 128 KB as schematically shown in FIG. 1 and as described in 'Principals of Operations', Second Edition (November 1996) in IBM Document: SA22-7832-00.pdf, page 7-61.

Figure 1A:
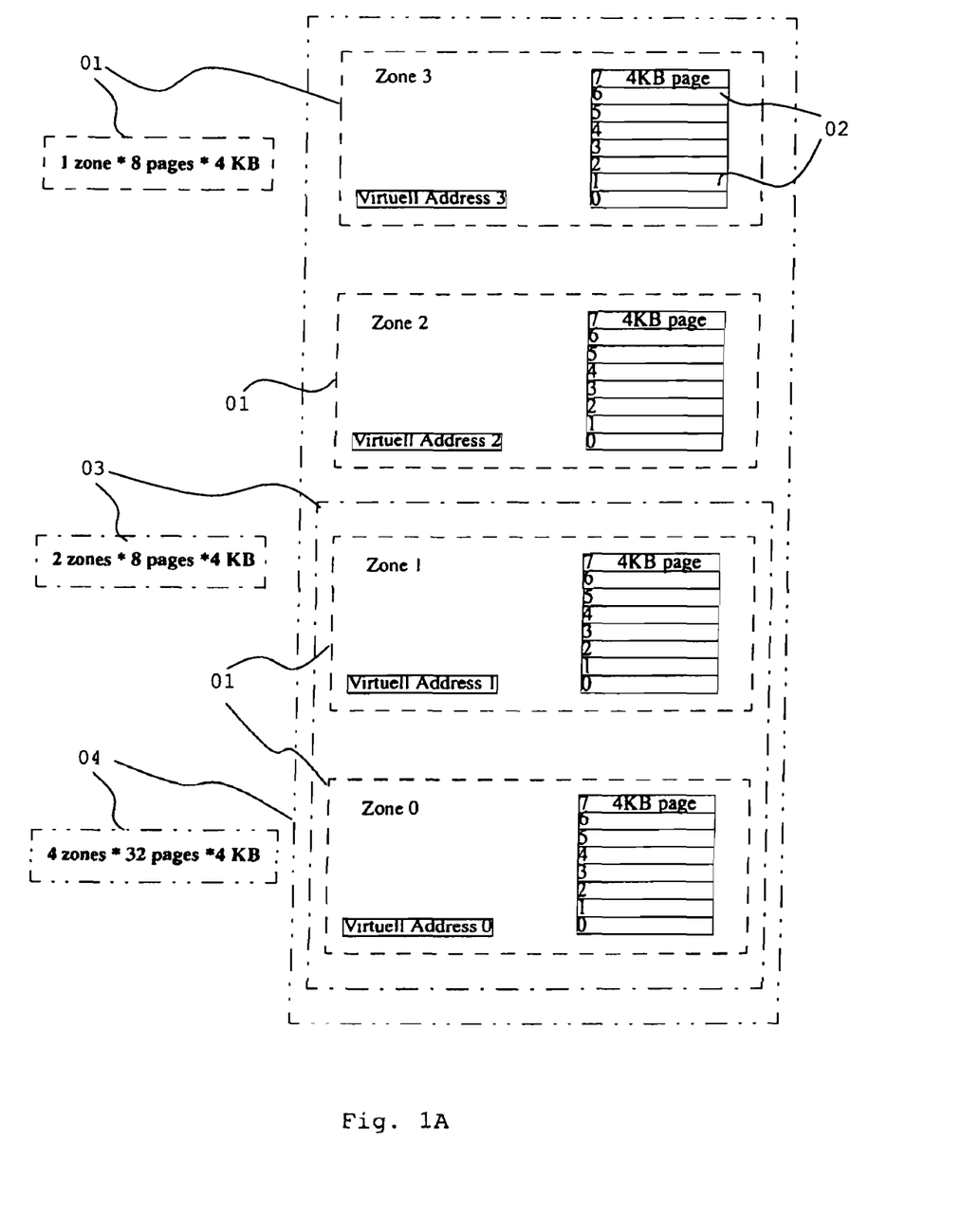
FIG. 1A shows a scheme of a flexible TLB zone assignment.

A dictionary size of 32 KB is achieved by using one zone 01 or compartment 01, each zone 01 or compartment comprising eight pages 02 or entries 02 of 4 KB respectively. A dictionary size of 64 KB is achieved by using a pair 03 of two zones 01. Further, a dictionary size of 128 KB is achieved by using a group 04 of two pairs 02, i.e. a group 04 of four zones 01.

The flexible TLB zone assignment shown in FIG. 1A in accordance with an illustrative embodiment is possible, because of consecutive virtual addresses within one zone.

Instructions in succession according to the executed software program, also called instruction stream of the processor, may include CMPSC instructions in random sequence and alternating configurations.

Figure 1B:
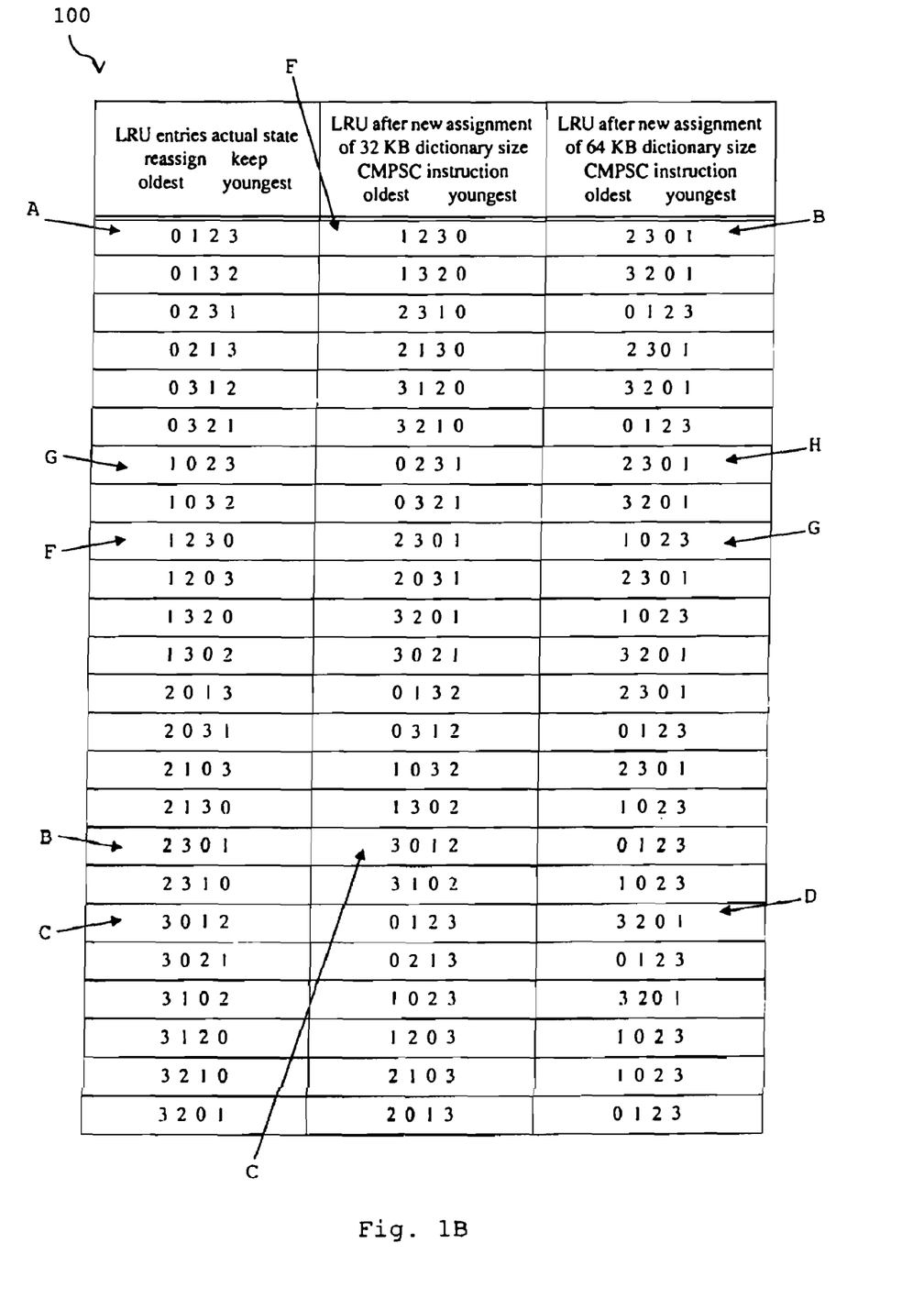
FIG. 1B depicts a table that schematically shows LRU reassignments from actual to CMPSC instruction based entries.

FIG. 1B depicts table 100 that shows LRU reassignments for a succession of executed CMPSC instructions based entries in accordance with an illustrative embodiment.

Within the example given in table 100 there are four LRU entries to manage and an initial LRU sequence from oldest to youngest entries is 0,1,2,3 (A). As a main rule the youngest entry is kept and the oldest entry is overwritten, so that a former oldest entry becomes the youngest entry after a LRU update. Within this example there is no reuse of an LRU entry, because all the CMPSC instructions applied use different virtual address spaces that lead to new LRU entries.

Assumed the first CMPSC instruction applied to the LRU would need 64 KB of dictionary size, the LRU sequence will be updated from 0,1,2,3 (A) =>2,3,0,1 (B).

Next CMPSC instruction applied with 32 KB dictionary size will move the LRU sequence from 2,3,0,1 (B) =>3,0,1,2 (C).

Another CMPSC instruction with 64 KB dictionary size will lead to this sequence: 3,0,1,2 (C) =>3,2,0,1 (D).

A 128 KB dictionary size CMPSC instruction will rearrange the LRU sequence from 3,2,0,1 (D) =>0,1,2,3 (A).

Another CMPSC with 8 KB dictionary size will move the LRU sequence from 0,1,2,3 (A) =>1,2,3,0 (F).

Two consecutive 64 KB dictionary size CMPSC instructions will lead to these moves in LRU sequence:
1,2,3,0 (F) =>1,0,2,3 (G) =>2,3,0,1 (H).

Figure 1C:
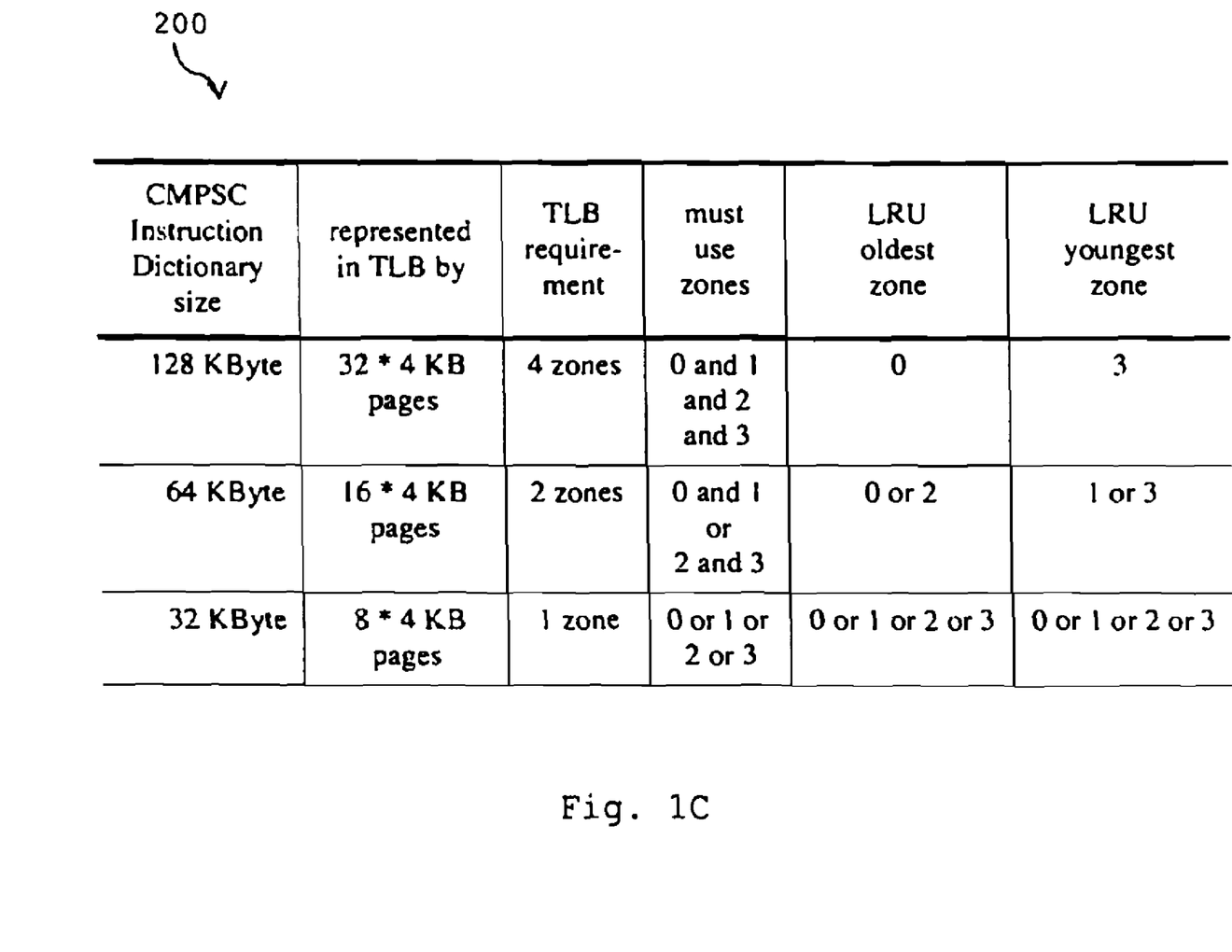
FIG. 1C depicts a table that schematically shows a LRU zone assignment for oldest and youngest entries.

FIG. 1C depicts table 200 in which a LRU zone assignment for oldest and youngest entries is shown in accordance with an illustrative embodiment. A LRU youngest entry of a 64 KB dictionary size CMPSC instruction could be either 1 or 3, because there are 16*4 KB page address translations to hold, which require two LRU entries. Either entry 0 and 1 or entry 2 and 3. From this follows that the oldest entries are either 0 or 2. Also a 128 KB dictionary size CMPSC instruction requires all LRU entries, which leads to the youngest LRU entry of 3 and oldest will have the value of 0. The small 32 KB CMPSC instructions require only a single entry. This means each value between 0 and 3 could became either youngest or oldest.

Figure 1D:
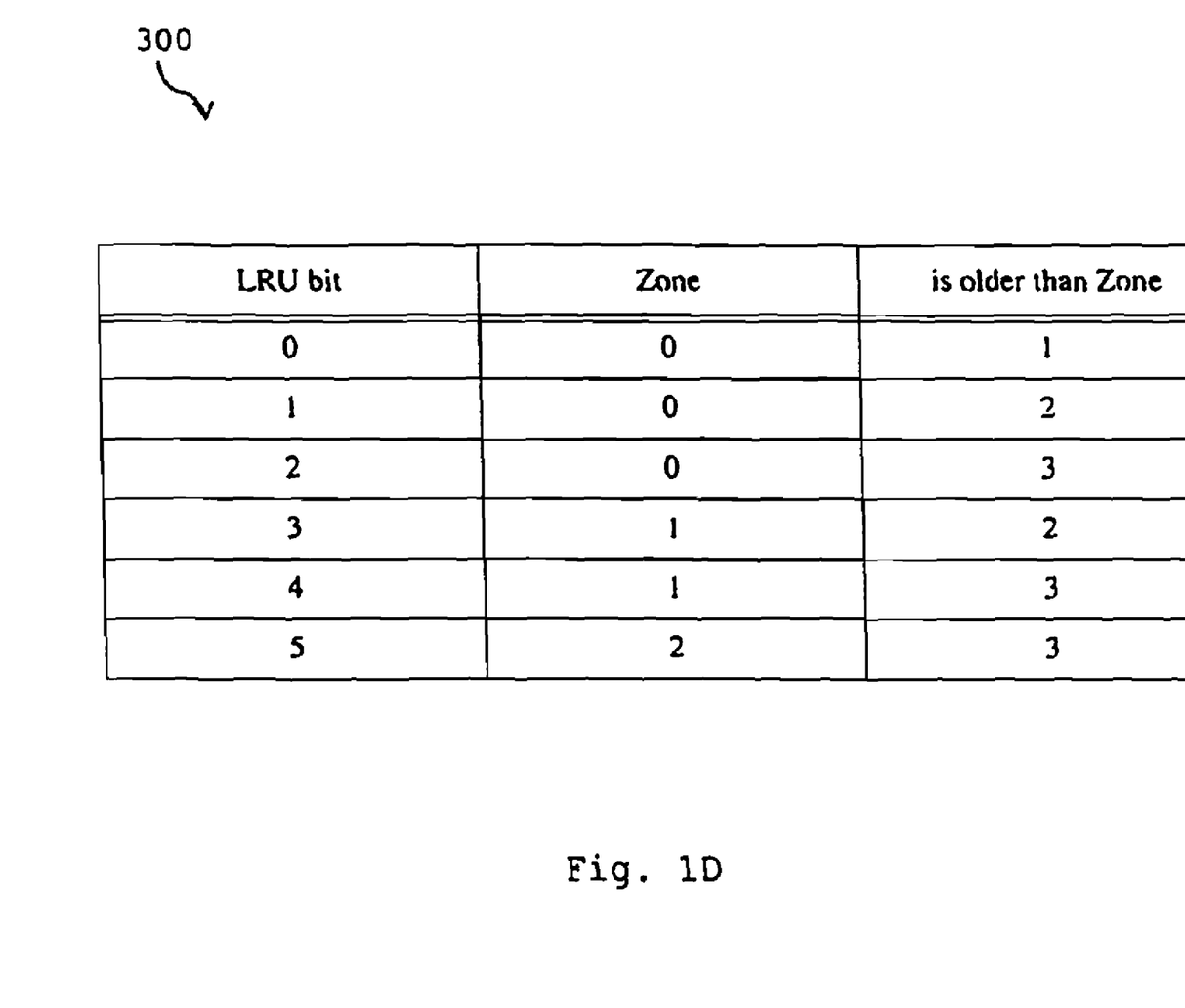
FIG. 1D depicts a table that shows a six Bit LRU Principle.

FIG. 1D depicts table 300 in which a six bit (0, . . . ,5) LRU Principle is shown in accordance with an illustrative embodiment. Thereby each LRU bit describes the relation between two zones. LRU Bit (0, . . . , 5) set to 0×38 means that zone 0 is older than zone 1, zone 2 and zone 3. Therefore zone 0 would be the next to be replaced by the next LRU update.

Implementation schematics are shown in FIGS. 2-5.

Figure 2:
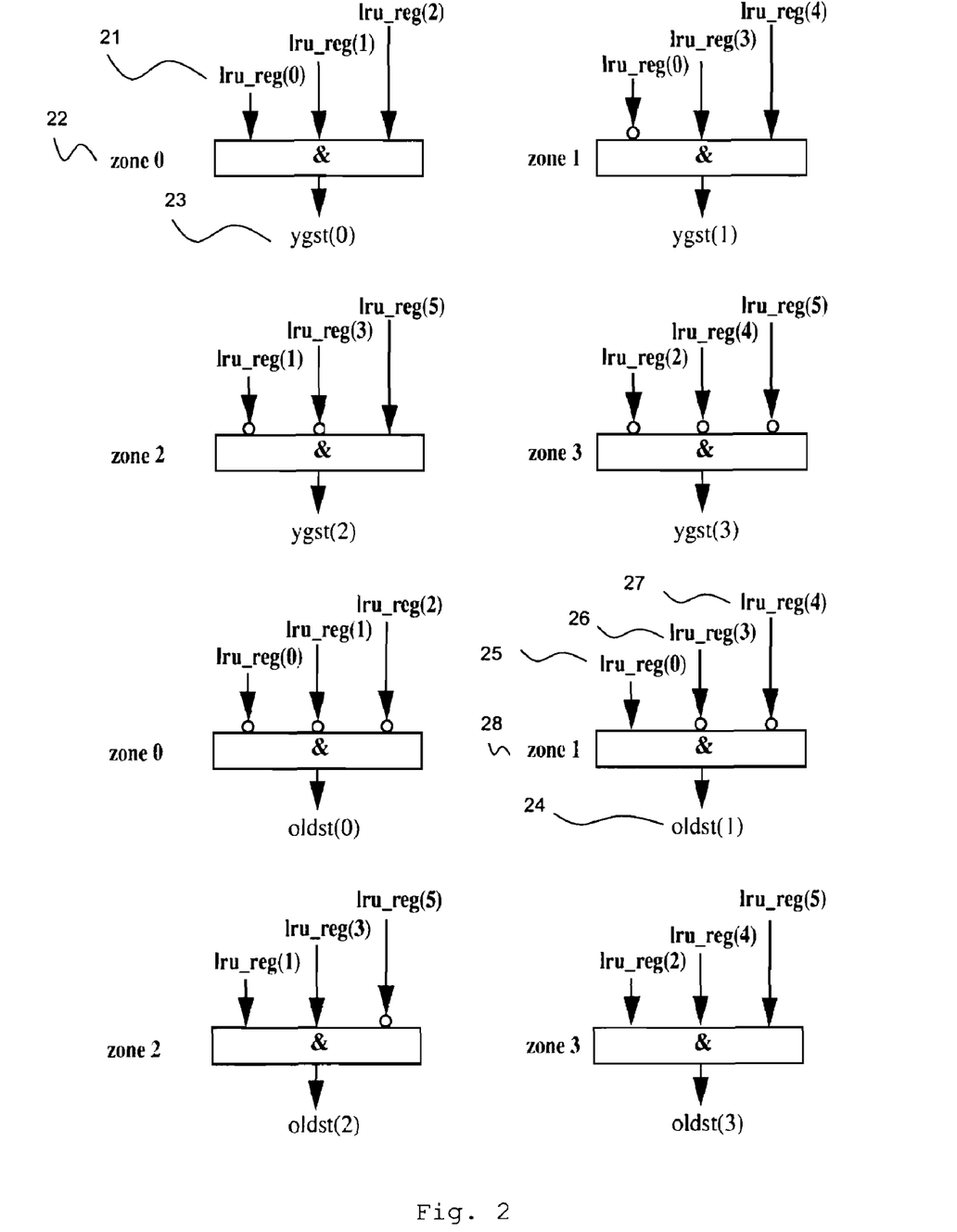
FIG. 2 schematically shows youngest vs. oldest zones in accordance with an illustrative embodiment.

FIG. 2 shows the logical assignment for the oldest and youngest vectors for each zone in accordance with an illustrative embodiment. The ygst (0) bit 23 for zone0 22 is assigned by the logical function AND of the outputs of the LRU Register bits 1ru_reg(0), 1ru_reg(1), 1ru_reg(2) 21.

The oldest vector oldst(1) 24 for zone1 28 is build by the logical AND of LRU Register output of bit 1ru_reg(0) 25 and the inversion of LRU Register bit 1ru_reg(3) 26 and the inversion of LRU Register bit 1ru_reg(4) 27.

Figure 3:
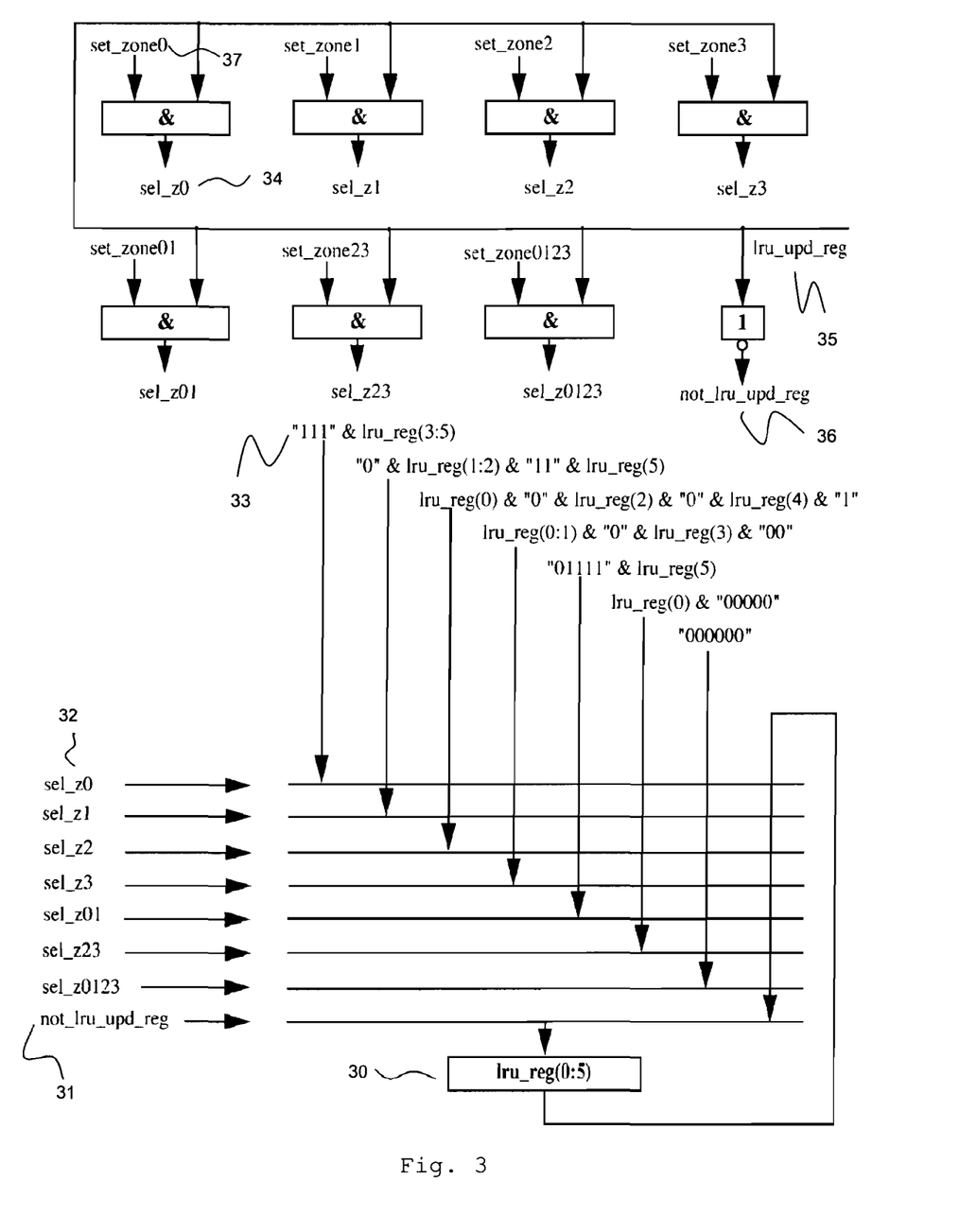
FIG. 3 shows a schematic of a LRU algorithm according to the invention in accordance with an illustrative embodiment.

FIG. 3 shows the logical implementation of the LRU Register bits 1ru_reg(0:5) 30 in accordance with an illustrative embodiment. Only one of the multiplexer bits not_1ru_upd_reg, sel_z0, sel_z1, sel_z2, sel_z3, sel_z01, sel_z23, sel_z0123 31, 32 can become active at a time.

The LRU Register 1ru_reg(0:5) 30 holds its value as long as the signal not_1ru_upd_reg 31 is active. If sel20 32 becomes active the LRU Register will load the value of vector "111 & 1ru_reg(3:5)" 13. So 1ru_reg bit 0 will be loaded with the value of logical "1". The same value will be assigned to 1ru_reg bits 1 and 2, 1ru_reg output bits 3,4,5 (3:5) will be loaded into the input of the LRU Register 30 and therefore will remain as they where before the LRU update.

The multiplexer control signal sel_z0 34 is generated as follows: It is the logical AND equivalent of signal 1ru_upd_reg 35 and the set_zone0 37 signal.

not_1ru_upd_reg 36 is the logical INVERSION of 1ru_upd_reg 35.

Figure 4:
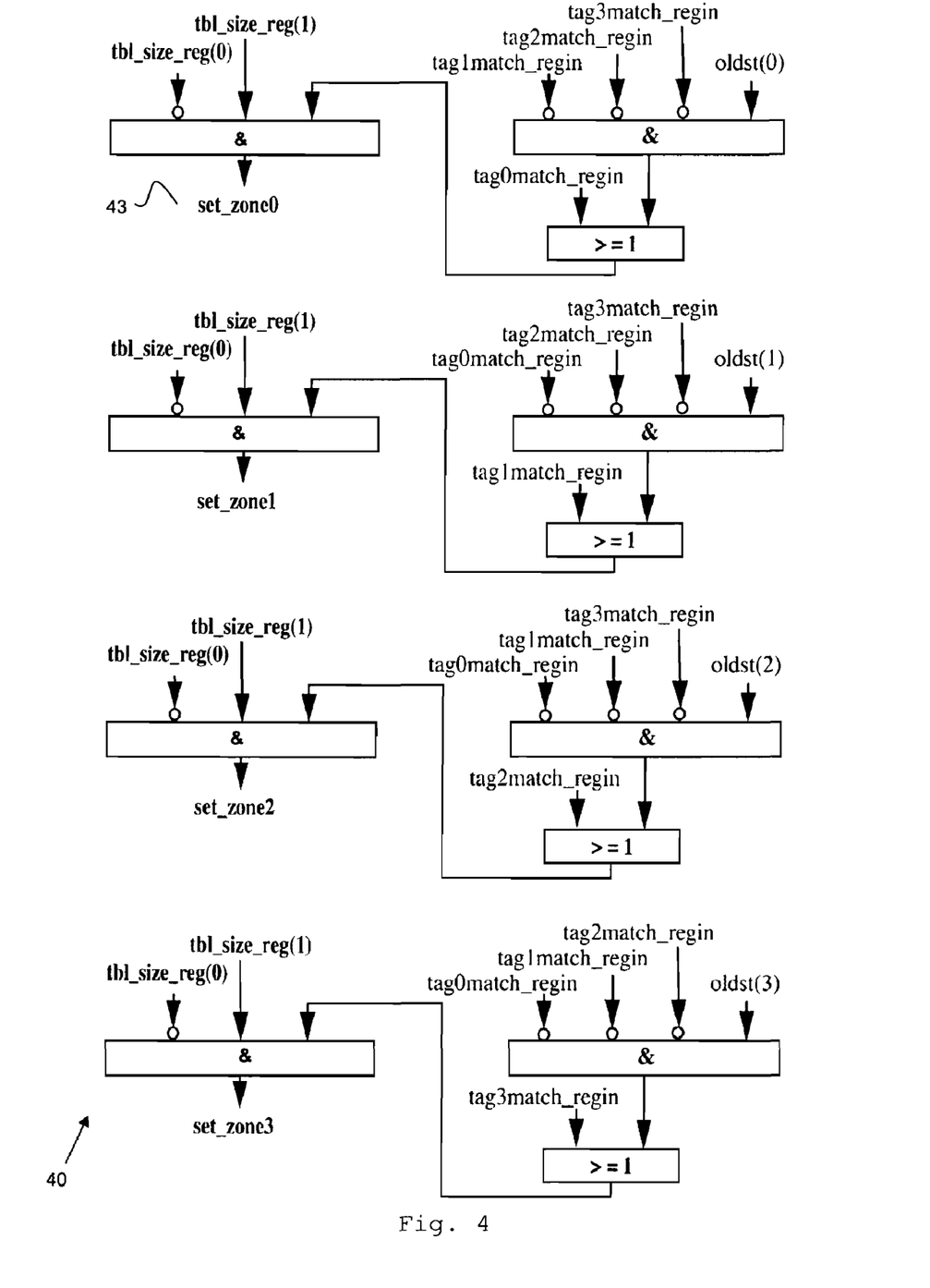
FIG. 4 shows a schematic of a zone assignment for four zones in accordance with an illustrative embodiment.
Figure 5:
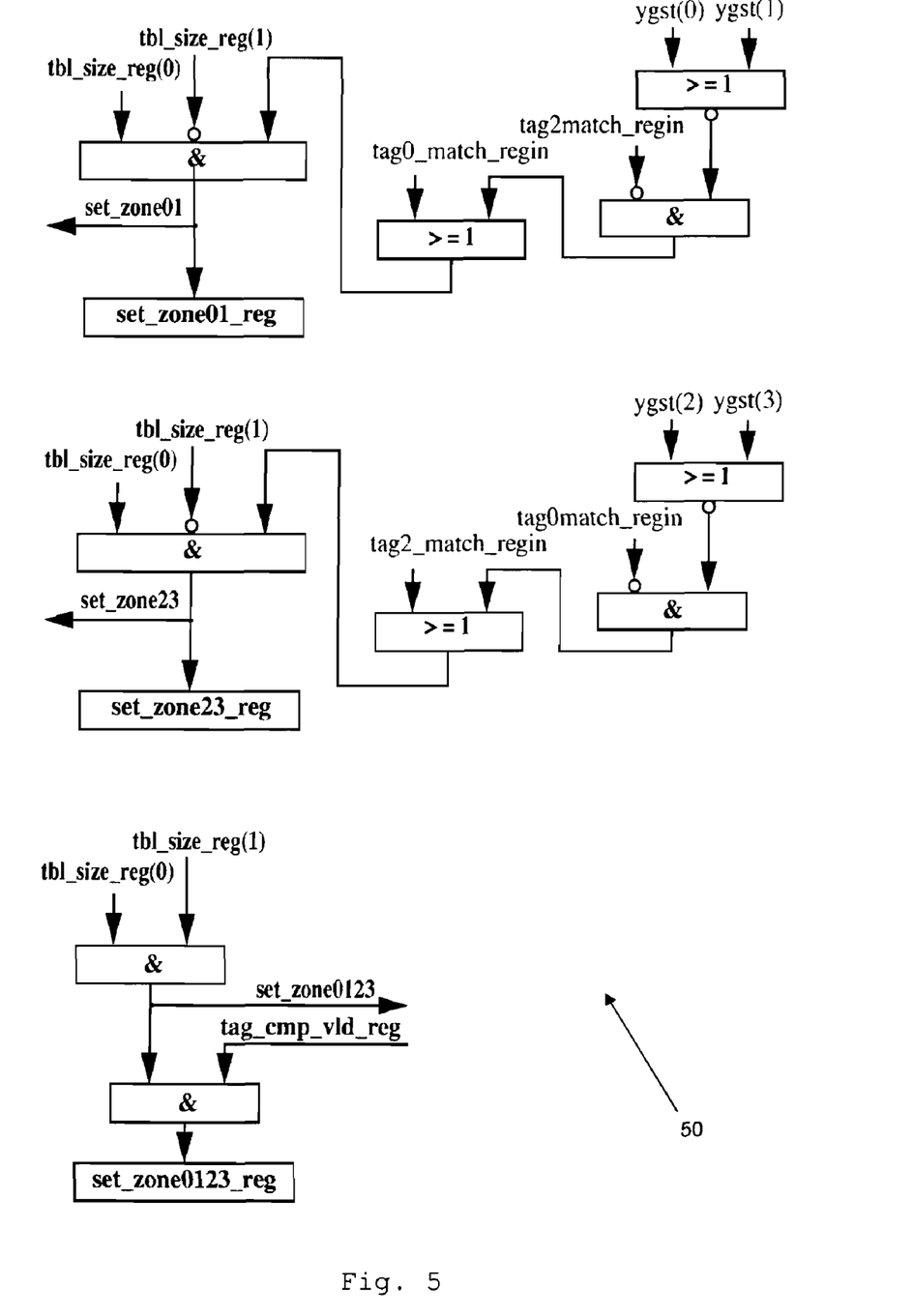
FIG. 5 shows a schematic of a zone assignment for three zones in accordance with an illustrative embodiment.

FIG. 4 shows an implementation 40 of the set_zone(0-3) signals in accordance with an illustrative embodiment, FIG. 5 shows an implementation 50 the set_zone01, set_zone23 and set_zone0123 signals in accordance with an illustrative embodiment.

The Set_zone signal 43 is build by the logical function of INVERSION of tbl_size_reg(0) AND tbl_size_reg(1) AND (tag0match_regin OR (oldst(0) AND NOT tag1match_regin AND NOT tag2match_regin AND NOT tag3match_regin)).

The tbl_size_reg signals represent the amount of needed TLB entries.

8 TLB entries are represented by tbl_size_reg(0-1)="01". 16 TLB entries are represented by tbl_size_reg(0-1)="10". 32 TLB entries are represented by tbl_size_reg(0-1)="11". The tag*match_regin signals are build by complex logical functions which depend on the microprocessor architecture and CMPSC instruction.

While the present invention has been described in detail, in conjunction with specific preferred embodiments, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method, in a data processing system having a co-processor, memory, and processor, for processing a set of instructions used to access the memory the method comprising:
receiving, by the co-processor, the set of instructions from the processor to access a main memory by the co-processor, wherein the set of instructions comprises a set of virtual addresses; and
translating, by the co-processor the set of virtual addresses into a set of absolute addresses in order for the co-processor to access the main memory, wherein translating the set of virtual addresses into the set of absolute addresses comprises:
accessing, by the co-processor, a Translation Lookaside Buffer (TLB) comprising a plurality of zones that are assigned by the co-processor to identify virtual addresses that are accessed during execution of the set of instructions in a flexible manner more than one at a time;
identifying, by the coprocessor, a set of oldest zones in the plurality of zones based on an actual compression service call (CMPSC) instruction using a Least Recently Used (LRU) algorithm, wherein the CMPSC instruction identifies a dictionary size required to execute the instruction and wherein a number of zones of the plurality of zones proportionally relates to the dictionary size; and
replacing, by the co-processor, one or more of the set of oldest zones based on the set of oldest zones identified using the LRU algorithm.

2. The method of claim 1, wherein the CMPSC instruction uses dictionary sizes of 32 KB, 64 KB, or 128 KB.

3. The method of claim 2, wherein a dictionary size of 32 KB is achieved by using one zone comprising eight pages of 4 KB respectively.

4. The method of claim 2, wherein a dictionary size of 64 KB is achieved by using a pair of two zones, each zone comprising eight pages of 4 KB respectively.

5. The method of claim 2, wherein a dictionary size of 128 KB is achieved by using a group of two pairs, each pair comprising two zones and each zone comprising eight pages of 4 KB respectively.

6. The method of claim 2, wherein a flexible LRU assignment is achieved by alternatively combining four zones with eight 4 KB pages each, to comprise at least one of:
thirty-two 4 KB pages within a group of four zones,
two times sixteen 4 KB pages within two pairs of two zones respectively,
one time sixteen 4 KB pages plus two times eight 4 KB pages within one pair of two zones plus two independent zones,
two times eight 4 KB pages plus one time sixteen 4 KB pages within two independent zones plus one pair of two zones, or
four times eight 4 KB pages within four independent zones.

7. The method of claim 1, wherein an instruction stream includes CMPSC instructions in random sequence and alternating configurations.

8. A computer program product comprising a non-transitory computer recordable medium having a computer readable program recorded thereon, wherein the computer readable program, when executed on a computing device, causes the computing device to:
receive, by a co-processor, the set of instructions from a processor to access a main memory by the co-processor, wherein the set of instructions comprises a set of virtual addresses; and
translate, by the co-processor the set of virtual addresses into a set of absolute addresses in order for the co-processor to access the main memory, wherein translating the set of virtual addresses into the set of absolute addresses comprises:
access, by the co-processor, a Translation Lookaside Buffer (TLB) comprising a plurality of zones that are assigned by the co-processor to identify virtual addresses that are accessed during execution of the set of instructions in a flexible manner more than one at a time;
identify, by the co-processor, a set of oldest zones in the plurality of zones based on an actual compression service call (CMPSC) instruction using a Least Recently Used (LRU) algorithm, wherein the CMPSC instruction identifies a dictionary size required to execute the instruction and wherein a number of zones of the plurality of zones proportionally relates to the dictionary size; and
replace, by the co-processor, one or more of the set of oldest zones based on the set of oldest zones identified using the LRU algorithm.

9. The computer program product of claim 8, wherein the CMPSC instruction uses dictionary sizes of 32 KB, 64 KB, or 128 KB.

10. The computer program product of claim 9, wherein a dictionary size of 32 KB is achieved by using one zone comprising eight pages of 4 KB respectively.

11. The computer program product of claim 9, wherein a dictionary size of 64 KB is achieved by using a pair of two zones, each zone comprising eight pages of 4 KB respectively.

12. The computer program product of claim 9, wherein a dictionary size of 128 KB is achieved by using a group of two pairs, each pair comprising two zones and each zone comprising eight pages of 4 KB respectively.

13. The computer program product of claim 9, wherein a flexible LRU assignment is achieved by alternatively combining four zones with eight 4 KB pages each, to comprise at least one of:
thirty-two 4 KB pages within a group of four zones,
two times sixteen 4 KB pages within two pairs of two zones respectively,
one time sixteen 4 KB pages plus two times eight 4 KB pages within one pair of two zones plus two independent zones, two times eight 4 KB pages plus one time sixteen 4 KB pages within two independent zones plus one pair of two zones, or four times eight 4 KB pages within four independent zones.

14. The computer program product of claim 8, wherein an instruction stream includes CMPSC instructions in random sequence and alternating configurations.

15. An apparatus, comprising:

a processor;

a co-processor; and a memory coupled to the processor and the co-processor, wherein the memory comprises instructions which, when executed by the co-processor, cause the co-processor to:

receive, by the co-processor, the set of instructions from the processor to access a main memory by the co-processor, wherein the set of instructions comprises a set of virtual addresses; and translate, by the co-processor the set of virtual addresses into a set of absolute addresses in order for the co-processor to access the main memory, wherein translating the set of virtual addresses into the set of absolute addresses comprises:

access, by the co-processor, a Translation Lookaside Buffer (TLB) comprising a plurality of zones that are assigned by the co-processor to identify virtual addresses that are accessed during execution of the set of instructions in a flexible manner more than one at a time;

identify, by the co-processor, a set of oldest zones in the plurality of zones based on an actual compression service call (CMPSC) instruction using a Least Recently Used (LRU) algorithm, wherein the CMPSC instruction identifies a dictionary size required to execute the instruction and wherein a number of zones of the plurality of zones proportionally relates to the dictionary size; and replace, by the co-processor, one or more of the set of oldest zones based on the set of oldest zones identified using the LRU algorithm.

16. The apparatus of claim 15, wherein the CMPSC instruction uses dictionary sizes of 32 KB, 64 KB, or 128 KB and wherein an instruction stream includes CMPSC instructions in random sequence and alternating configurations.

17. The apparatus of claim 16, wherein a dictionary size of 32 KB is achieved by using one zone comprising eight pages of 4 KB respectively.

18. The apparatus of claim 16, wherein a dictionary size of 64 KB is achieved by using a pair of two zones, each zone comprising eight pages of 4 KB respectively.

19. The apparatus of claim 16, wherein a dictionary size of 128 KB is achieved by using a group of two pairs, each pair comprising two zones and each zone comprising eight pages of 4 KB respectively.

20. The apparatus of claim 16, wherein a flexible LRU assignment is achieved by alternatively combining four zones with eight 4 KB pages each, to comprise at least one of:

thirty-two 4 KB pages within a group of four zones, two times sixteen 4 KB pages within two pairs of two zones respectively, one time sixteen 4 KB pages plus two times eight 4 KB pages within one pair of two zones plus two independent zones, two times eight 4 KB pages plus one time sixteen 4 KB pages within two independent zones plus one pair of two zones, or four times eight 4 KB pages within four independent zones.

\* \* \* \* \*